United States Patent
Narumi et al.

(10) Patent No.: US 6,724,166 B2
(45) Date of Patent: Apr. 20, 2004

(54) APPARATUS FOR REDUCING MOTOR DRIVING NOISE AND METHOD FOR GENERATING MOTOR DRIVING NOISE REDUCING SIGNAL

(75) Inventors: Satoshi Narumi, Tokyo (JP); Hiroyuki Tamagawa, Tokyo (JP); Masaharu Hoashi, Tokyo (JP)

(73) Assignees: Renesas Technology Corp., Tokyo (JP); Mitsubishi Electric Engineering Company Limited, Tokyo (JP)

( * ) Notice: Subject to any disclaimer, the term of this patent is extended or adjusted under 35 U.S.C. 154(b) by 0 days.

(21) Appl. No.: 10/167,078

(22) Filed: Jun. 12, 2002

(65) Prior Publication Data

US 2003/0020426 A1 Jan. 30, 2003

(30) Foreign Application Priority Data

Jul. 27, 2001 (JP) ........................................ 2001-228110

(51) Int. Cl.[7] ............................ H02P 7/638; H01R 39/46
(52) U.S. Cl. ...................... 318/439; 318/811; 318/599
(58) Field of Search .................. 318/254, 811, 318/599, 611, 439, 650, 138, 799, 801, 803, 720

(56) References Cited

U.S. PATENT DOCUMENTS

| | | | |
|---|---|---|---|
| 6,002,226 A | * 12/1999 | Collier-Hallman et al. | . 318/439 |
| 6,078,161 A | * 6/2000 | Kim et al. | ... 318/701 |
| 6,242,875 B1 | 6/2001 | Kusaka et al. | |
| 6,291,960 B1 | * 9/2001 | Crombez | ....... 318/599 |
| 6,448,724 B1 | * 9/2002 | Kleinau et al. | ....... 318/254 |
| 6,504,334 B2 | * 1/2003 | Sogawa | ....... 318/599 |

FOREIGN PATENT DOCUMENTS

| | | | | |
|---|---|---|---|---|
| JP | 63124773 A | * 5/1988 | ....... | H02M/7/48 |
| JP | 07067377 A | * 3/1995 | ....... | H02P/6/12 |
| JP | 2000287477 | 10/2000 | | |

* cited by examiner

*Primary Examiner*—Robert Nappi
*Assistant Examiner*—Eduardo Colon Santana
(74) *Attorney, Agent, or Firm*—Burns, Doane, Swecker & Mathis, L.L.P.

(57) ABSTRACT

There is disclosed an apparatus for reducing motor driving noise, comprising: a selecting circuit for selecting and outputting a current increasing or reducing signal based on a commutation control signal; and a signal synthesizing circuit for synthesizing the current increasing or reducing signal selected by the selecting circuit with a current application control signal supplied to the power supply side switching element of at least a pair of switching elements.

4 Claims, 20 Drawing Sheets

ENTIRE SYSTEM

BEFORE NOISE REDUCING CONTROL WAVEFORM SYNTHESIS

AFTER NOISE REDUCING CONTROL WAVEFORM SYNTHESIS

RELATION BETWEEN NOISE REDUCING WAVEFORM
GENERATOR AND PERIPHERAL WAVEFORM

NOISE REDUCING WAVEFORM GENERATOR

IN SIGNAL CONTROL
WAVEFORM

PWM DUTY: 50%

LE SIGNAL CONTROL
WAVEFORM

PWM DUTY: 50%→0%

CURRENT
WAVEFORM

CURRENT
WAVEFORM

LE SIGNAL CONTROL
WAVEFORM

PWM DUTY: 0%→50%

IN SIGNAL CONTROL
WAVEFORM

PWM DUTY: 50%

CURRENT
WAVEFORM

CURRENT
WAVEFORM

IN SIGNAL CONTROL
WAVEFORM

PWM DUTY: 80%

LE SIGNAL CONTROL
WAVEFORM

PWM DUTY: 80%→0%

CURRENT
WAVEFORM

CURRENT
WAVEFORM

LE SIGNAL CONTROL
WAVEFORM

PWM DUTY: 80%→0%

IN SIGNAL CONTROL
WAVEFORM

PWM DUTY: 80%

CURRENT
WAVEFORM

CURRENT
WAVEFORM

NOISE REDUCING CONTROL SIGNAL

NOISE REDUCING CURRENT WAVEFORM

BEFORE LOW ROTATION CONTROL MEASURES

AFTER LOW ROTATION CONTROL MEASURES

EXPANDED VIEW AFTER LOW
ROTATION CONTROL MEASURES

120° CURRENT APPLICATION CONTROL SIGNAL

CONVENTIONAL PWM WAVEFORM PATTERN

SIMPLE ADDITION OF NOISE REDUCING WAVEFORM
TO CONVENTIONAL PWM WAVEFORM

NOISE REDUCING CURRENT WAVEFORM

BRAKE PHENOMENON

FIG.32 (PRIOR ART)

| SIGNAL NAME | PHASE | STATE | MEANING OF SIGNAL |
|---|---|---|---|
| LEU | U PHASE | "H" | TURN OFF BOTH Q1 AND Q2 |
| | | "L" | TURN ON EITHER Q1 OR Q2 INDICATED BY INU SIGNAL |
| INU | | "H" | SPECIFY Q1 |
| | | "L" | SPECIFY Q2 |
| LEV | V PHASE | "H" | TURN OFF BOTH Q3 AND Q4 |
| | | "L" | TURN ON EITHER Q3 OR Q4 INDICATED BY INV SIGNAL |
| INV | | "H" | SPECIFY Q3 |
| | | "L" | SPECIFY Q4 |
| LEW | W PHASE | "H" | TURN OFF BOTH Q5 AND Q6 |
| | | "L" | TURN ON EITHER Q5 OR Q6 INDICATED BY INW SIGNAL |
| INW | | "H" | SPECIFY Q5 |
| | | "L" | SPECIFY Q6 |

APPARATUS FOR REDUCING MOTOR DRIVING NOISE AND METHOD FOR GENERATING MOTOR DRIVING NOISE REDUCING SIGNAL

BACKGROUND OF THE INVENTION

1. Field of the Invention

This invention relates to a motor for successively applying currents to respective phase windings by the ON/OFF operations of switching elements. More particularly, the invention is related to an apparatus for reducing motor driving noise, which is designed to reduce driving noise caused by the switching of a current applied to each phase winding, and also a method for generating a motor driving noise reducing signal.

2. Description of Related Art

FIG. 22 shows an example of the driving circuit of a 3 phase brushless motor 101. In the example, each of the paired transistors Q1 and Q2, Q3 and Q4, and Q5 and Q6 as switching elements are connected in series between a power supply and a ground, wherein one end of each of the transistors Q1, Q3 and Q5 is connected to a power supply terminal, and one end of each of the transistors Q2, Q4 and Q6 is grounded through a current sense resistor 102, and wherein one end of each of the star-connected phase windings 101U, 101V and 101W of the motor 101 is connected to each of the connection points P1 P2, and P3 of each of the paired transistors Q1 and Q2, Q3 and Q4, and Q5 and Q6.

FIG. 23 shows a circuit for generating a driving signal to be supplied/applied to each of the above-described transistors. In the drawing, a reference numeral 104 denotes an input terminal for receiving the entry of 120° current application control signals LEU, LEV and LEW (referred to as LE or LE signal, hereinafter) and 180° current application direction deciding signals INU, INV and INW (referred to as IN or IN signal, hereinafter) outputted from a pulse signal generating circuit, not shown; 105 a PWM waveform signal generator for generating a PWM waveform signal; 106 a PWM synthesizer for synthesizing the PWM waveform signal and the IN signals; and 107 an output terminal for outputting the LE signals and the IN signals outputted from the PWM synthesizer 106, specifically outputting the LE signals and the IN signals of PWM waveform patterns shown in FIG. 24. These six kinds of signals (current application control signals LEU, LEV and LEW, and current application direction deciding signals INU, INV and INW) have meanings as shown in FIG. 32.

Each of FIGS. 25A to 25F show a state that the motor is driven by applying the IN signals of the PWM waveform pattern to the ground side transistors Q2, Q4 and Q6 (low side), and applying the LE signals of the PWM waveform pattern to the power supply side transistors Q1, Q3 and Q5 (high side), and thereby successively supplying currents to the respective phase windings 101U, 101V and 101W of the motor 101 by every 60°. In FIGS. 24 and 26, com 1 to com 6 show the states in which currents are supplied to the windings 101U, 101V and 101W by timings in the case of 120° current application, and the timings are shown in FIGS. 25A to 25F. In this case, since a square-wave current flows to each of the phase windings 101U, 101V and 101W, sudden fluctuation occurs in torque, and the motor is vibrated to generate noise. This noise causes vibration by an integral multiple of the natural vibration of a casing covering the motor, and is generated in an audible band.

As explained above, the PWM driving is designed to switch a voltage applied to the motor 101, substantially between two ways, i.e., a power supply voltage and 0V, and control the amount of current flowing to the motor to be average based on the duty thereof Consequently, the current waveform of the PWM driving becomes a square current waveform, causing the generation of noise.

Then, as shown in FIG. 27, a signal for increasing the current of a duty waveform pattern and a signal for reducing a current are outputted from a noise reducing waveform signal generator 108. The signal for current increase and the signal for current reduction are selected by an INC/DEC selector 109 based on a COMOUT signal as a commutation control signal, and synthesized into the LE signals of PWM waveform patterns shown in FIG. 28 by a signal synthesizer 110. Then, the signals shown in FIG. 29 are applied to the transistors Q1, Q3 and Q5 of the motor driving circuit 101, and the currents like those shown in FIG. 30 are supplied to the respective phase windings. Accordingly, the current change becomes continuous during commutation control, causing no sudden torque changes. Therefore, the noise generated by the motor vibration is reduced.

However, when currents are supplied to the motor windings 101U, 101V and 101W by simply applying the IN and LE signals shown in FIG. 29 respectively to the transistors Q1, Q4 and A6, and the transistors Q1, Q3 and Q5, phases at points A to F shown in the same drawing may be short-circuited from one another depending on PWM timings.

FIG. 31 illustrates a state where phases are short-circuited from one another. A short brake is set in when the transistors Q1, Q3 and Q5 of FIG. 31 are simultaneously turned ON. The timing thereof is such that when the U phase turns On the power supply side transistors Q1, and the W phase is regenerated (transistor Q6 is OFF, while transistor Q5 is ON) to control a current, the current is supplied to the V phase earlier than a 120° current application timing, so that the transistor Q3 is turned ON. At this time, the power supply side transistors Q1, Q3 and Q5 are simultaneously turned ON. However, although a current must originally be supplied to the V phase, since the ground side transistors Q2, Q4 and Q6 are all OFF, no currents flow there.

As described above, in the conventional motor driving apparatus, since a square-wave current is supplied to each phase winding of the motor, torque fluctuation caused by a sudden current change is large. Accordingly, the apparatus for reducing motor driving noise has been developed to supply a current continuously changed even at the time of phase switching to each phase winding of the motor 101. However, although this apparatus can reduce the occurrence of vibration caused by a sudden current change, it cannot supply a current to an originally targeted phase because of the short-circuiting of the phases among one another. In other words, the problem of impossible driving has been inherent.

SUMMARY OF THE INVENTION

The present invention has been made to solve the foregoing problems, and it is an object of the invention to provide an apparatus for reducing motor driving noise, which is capable of reducing the occurrence of vibration, and preventing the short-circuiting of phases among one another. It is another object of the invention to provide a method for generating a motor driving noise reducing signal, which is executed by a digital circuit not requiring any large-capacity capacitors or the like, yet highly advantageous in cost performance and product yield.

In accordance with the invention, there is provided an apparatus for reducing motor driving noise, comprising: a plurality of switching circuits each including at least a pair of switching elements connected in series between a power supply and a ground; a motor, one end of each of its phase windings is connected to a switching element serial connection point of each of the switching circuits; a noise reducing circuit for generating a current increasing signal and a current reducing signal; a selecting circuit for selecting and outputting the current increasing signal and/or the current reducing signal based on a commutation control signal for changing a polarity at every prescribed electrical angle; a signal synthesizing circuit for synthesizing either the current increasing signal or the current reducing signal selected by the selecting circuit with a current application control signal supplied to a power supply side switching element of the pair of switching elements; a PWM waveform signal generator for outputting a PWM waveform signal based on a current control value; and a PWM synthesizer for synthesizing the PWM waveform signal with a current application direction deciding signal supplied to a ground side switching element of the pair of switching elements.

According to the motor driving noise reducing apparatus of the invention, the noise reducing circuit includes: a current control value output circuit for storing a current control value; a bias time counter for storing a current changing width of an electrical angle 30°; an arithmetic circuit for obtaining a current amplification factor from the current control value and the current changing width; a noise reducing duty increasing/decreasing timing signal generator for generating a duty control value based on a commutation control signal for reversing a polarity at every electrical angle 30°, a clock signal and the current amplification factor; and a noise reducing waveform signal generator for generating a current increasing signal for continuously increasing a current for the amount corresponding to the current changing width within an electrical angle 30°, and a current reducing signal for continuously reducing a current for the amount corresponding to the current changing width within an electrical angle 30°, based on the commutation control signal, the clock signal, the duty increasing/decreasing signal, and the current control value.

The motor driving noise reducing apparatus of the invention further comprises: position detecting means for comparing a terminal voltage of each phase winding of the motor with a voltage of a middle point at which the phase windings are connected with one another, and detecting the rotational position of the motor; and sensorless driving arithmetic means for outputting a signal that increases a current application width of a currently energized motor winding, based on a detection signal from the position detecting means.

In accordance with the invention, there is provided a method for generating a motor driving noise reducing signal, comprising the steps of: obtaining a current amplification factor by dividing a current changing width decided according to a motor revolution speed by a current control value: adding 1 to a duty control value every time a count value of a reference clock reaches the current amplification factor; determining whether the count value of the reference dock has reached a maximum value of the current amplification factor, until the count value of the reference clock reaches the duty control value; generating a current reducing signal by setting the count value and the current reduction rate to 0, if the maximum value has been reached; determining whether the count value of the reference clock has reached the maximum value of the current amplification factor, until the count value of the reference clock reaches a value obtained by adding to the duty control value the value which is obtained by subtracting the current control value from the upper limit of the current control value; generating a current increasing signal by setting the count value and the current amplification factor to 0, if the maximum value has been reached; and adding the current increasing signal and the current reducing signal to a current application control signal supplied to a power supply side switching element of switching elements connected in series between a power supply and a ground.

BRIEF DESCRIPTION OF THE DRAWINGS

FIG. 32 is a view showing a relation between an operation state of a switching element of each phase and each of LE and IN signals.

DETAILED DESCRIPTION OF THE PREFERRED EMBODIMENTS

Next, the preferred embodiments of the present invention will be described.

First Embodiment

Figure 1:
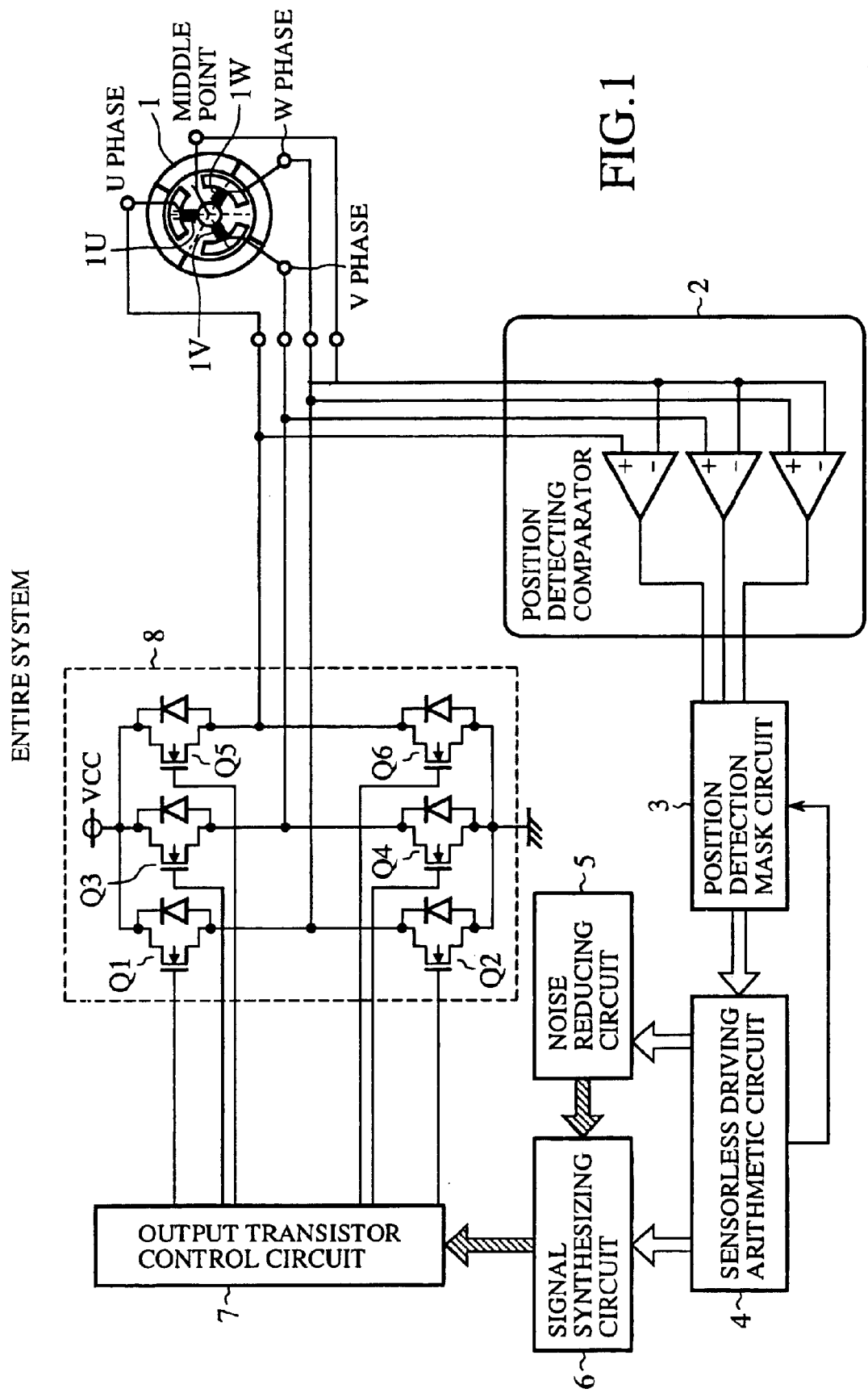
FIG. 1 is a block diagram showing the configuration of an entire system of a sensorless motor driver provided with a driving noise reducing apparatus of the present invention.

FIG. 1 shows the entire configuration of a motor driving noise reducing apparatus according to a first embodiment of the invention. A reference numeral 1 denotes a Hall sensorless motor (simply referred to as a motor, hereinafter) for detecting a rotor position without using any Hall sensors; 2 a position detecting comparator for detecting the rotor position depending on the high/low potential of each phase with respect to the middle point wiring of the motor 1; 3 a position detection mask circuit; 4 a sensorless driving arithmetic circuit; 5 a noise reducing circuit; 6 a signal synthesizing circuit for synthesizing the outputs respectively of the sensorless driving arithmetic circuit 4 and the noise reducing circuit 5 with each other; and 7 an output transistor control circuit for receiving the output of the signal synthesizing circuit 6, and outputting driving signals to transistors Q1 to Q6 of switching circuit 8. The position detection mask circuit 3 and the sensorless driving arithmetic circuit 4 receive a position detecting signal outputted from the position detecting comparator 2, and generate current application control signals LEU, LEV and LEW (referred to LE, hereinafter) and current application direction deciding signals INU, INV and INW (referred to as IN, hereinafter) as fundamental waveform signals to drive the motor 1.

Figure 2:
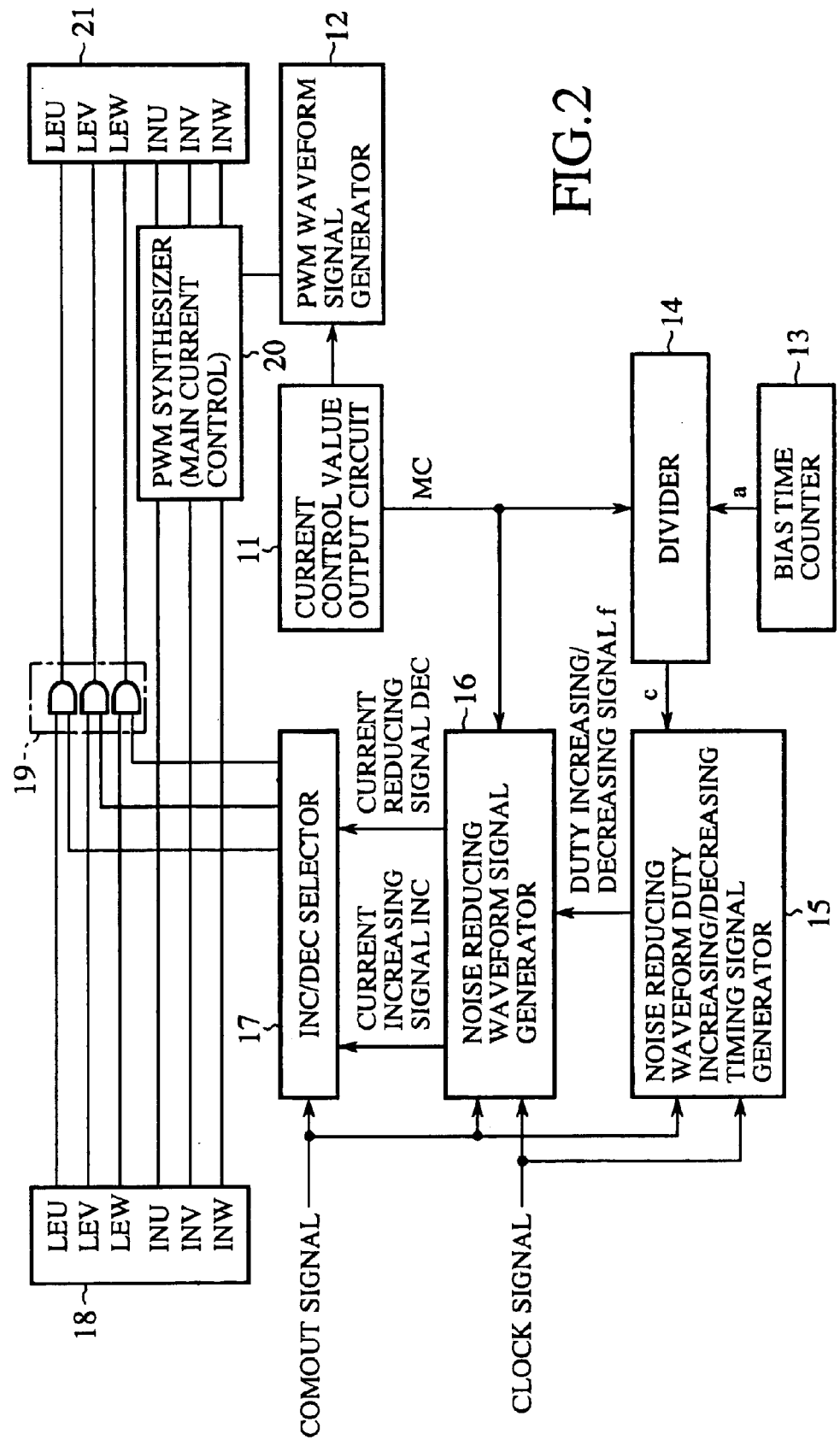
FIG. 2 is a block diagram showing a noise reducing circuit and its surrounding arrangement.

FIG. 2 shows in detail the portions, i.e., of the noise reducing circuit 5 and the signal synthesizing circuit 6. A reference numeral 11 denotes a current control value output circuit storing a current control value MC; 12 a PWM waveform signal generator for outputting a PWM waveform signal used to decide a main current based on the current control value MC outputted from the current control value output circuit 11; 13 a bias time counter for storing a value obtained by counting the time of an electrical angle 30° with a basic cycle; 14 a divider for performing division regarding the current control value MC outputted from the current control value output circuit 11 and the output value of the bias time counter 13, i.e. a current changing width a; 15 a noise reducing waveform duty increase/decrease timing signal generator (simply referred to as a timing signal generator, hereinafter) for receiving the entry of a current amplification factors outputted from the divider 14, a COMOUT signal as a commutation control signal, and a clock signal, and generating a timing signal used to increase/decrease a noise reducing waveform duty; and 16 a noise reducing waveform signal generator for receiving the entry of the current control value MC outputted from the current control value output circuit 11, the timing signal, the COMOUT signal and the clock signal, and generating and outputting a current increasing signal INC (referred to as an IN signal, hereinafter) and a current reducing signal DEC (referred to a DEC signal, hereinafter), pulse widths thereof being changed at a constant cycle. In this case, information regarding the amount of current control must be supplied for the current reducing signal DEC. However, for the current reducing signal INC, no information needs to be supplied due to the facts that it increases from 0%.

Figure 3:
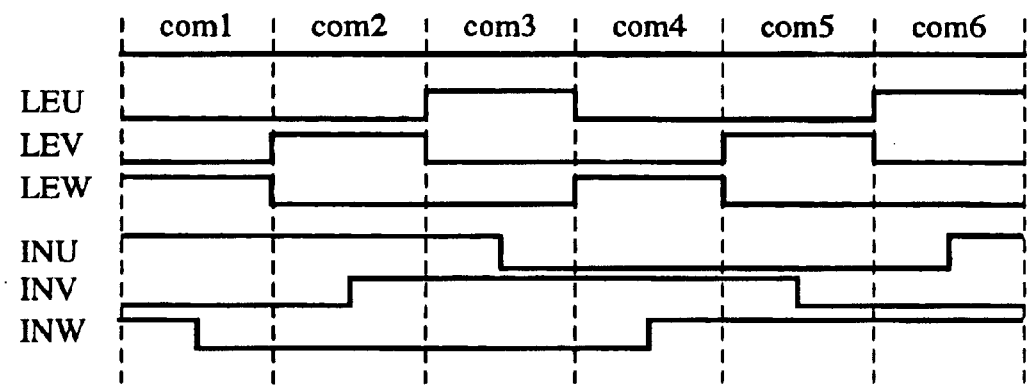
FIG. 3 is a waveform chart before synthesis of noise reducing control waveforms.
Figure 4:
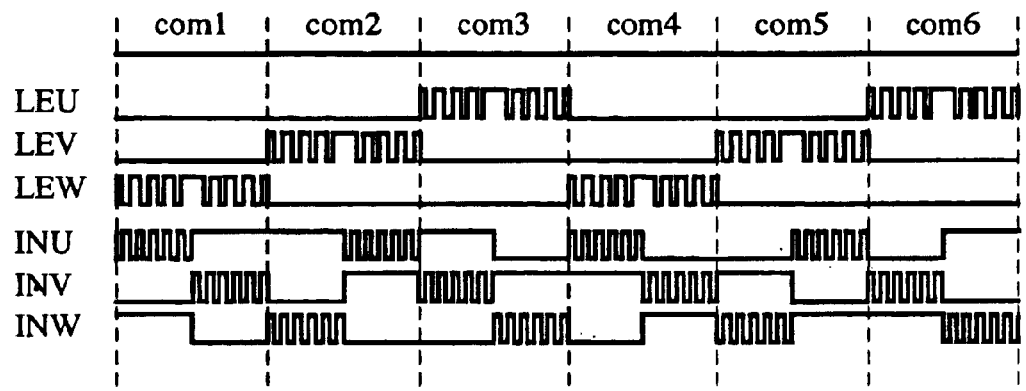
FIG. 4 is a waveform chart after synthesis of noise reducing control waveforms.

A reference numeral 17 denotes a selector for selecting and outputting the INC signal or the DEC signal based on the COMOUT signal; 18 an input terminal for entering waveform signals generated by the sensorless driving arithmetic circuit 4 before noise reducing control waveform synthesis shown in FIG. 3 is conducted; 19 a signal synthesizing circuit for synthesizing the LE signals with the INC signal or the DEC signal selected by the selector 17; 20 a PWM synthesizer for synthesizing the IN signals with a PWM waveform from the PWM waveform signal generator 12; and 21 an output terminal for outputting waveform signals after noise reducing control waveform synthesis shown in FIG. 4 is conducted.

Figure 5:
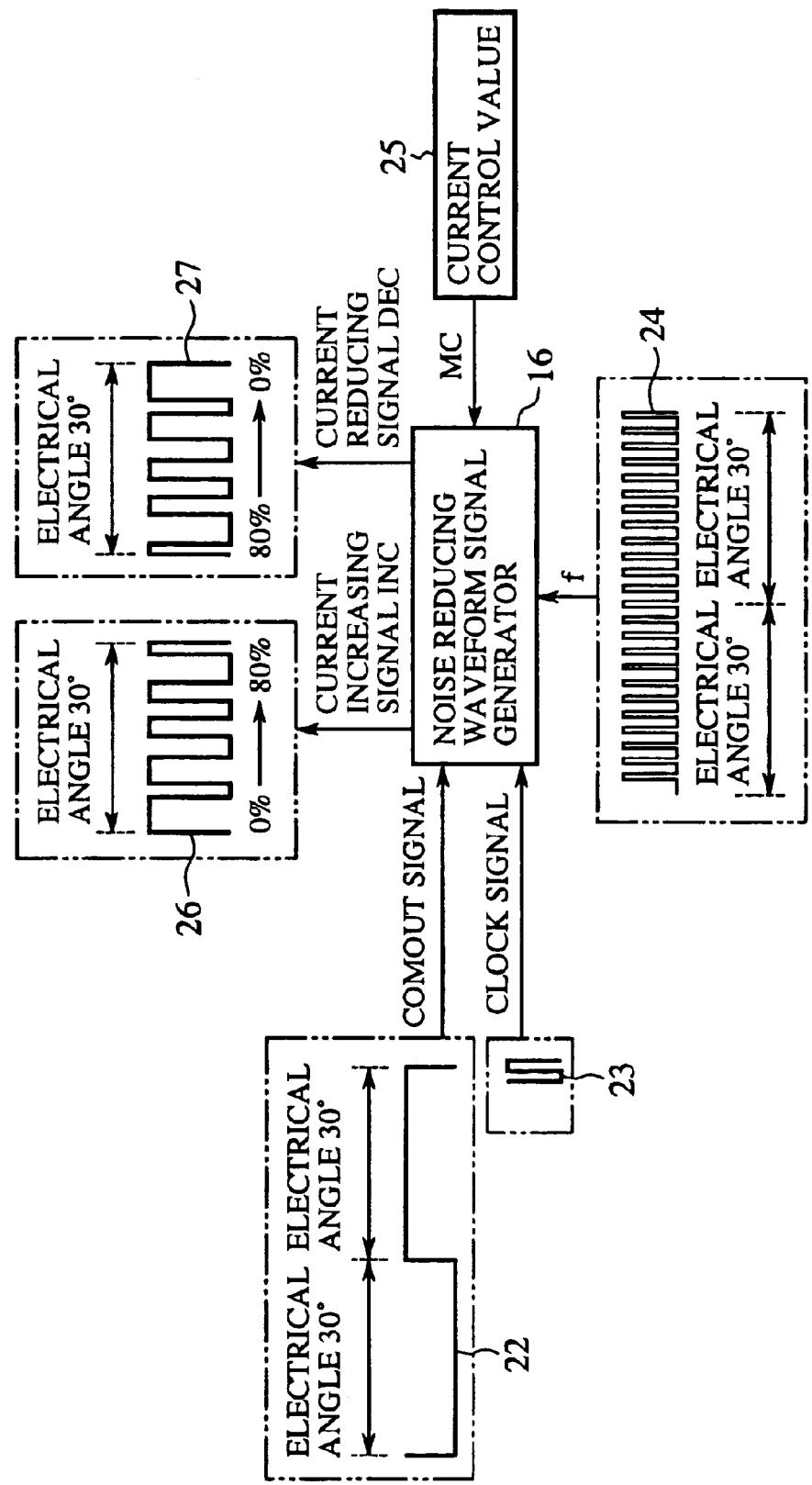
FIG. 5 is a block diagram showing the relation between a noise reducing waveform signal generator and the peripheral waveforms.

FIG. 5 shows the relation between the noise reducing waveform signal generator 16 and its peripheral signal waveforms. A reference numeral 22 denotes a COMOUT signal; 23 a clock signal; 24 denotes 12 timing signals outputted as a duty control value f within an electrical angle of 30°; 25 a current control value; 26 an INC signal; and 27 a DEC signal.

Figure 6:
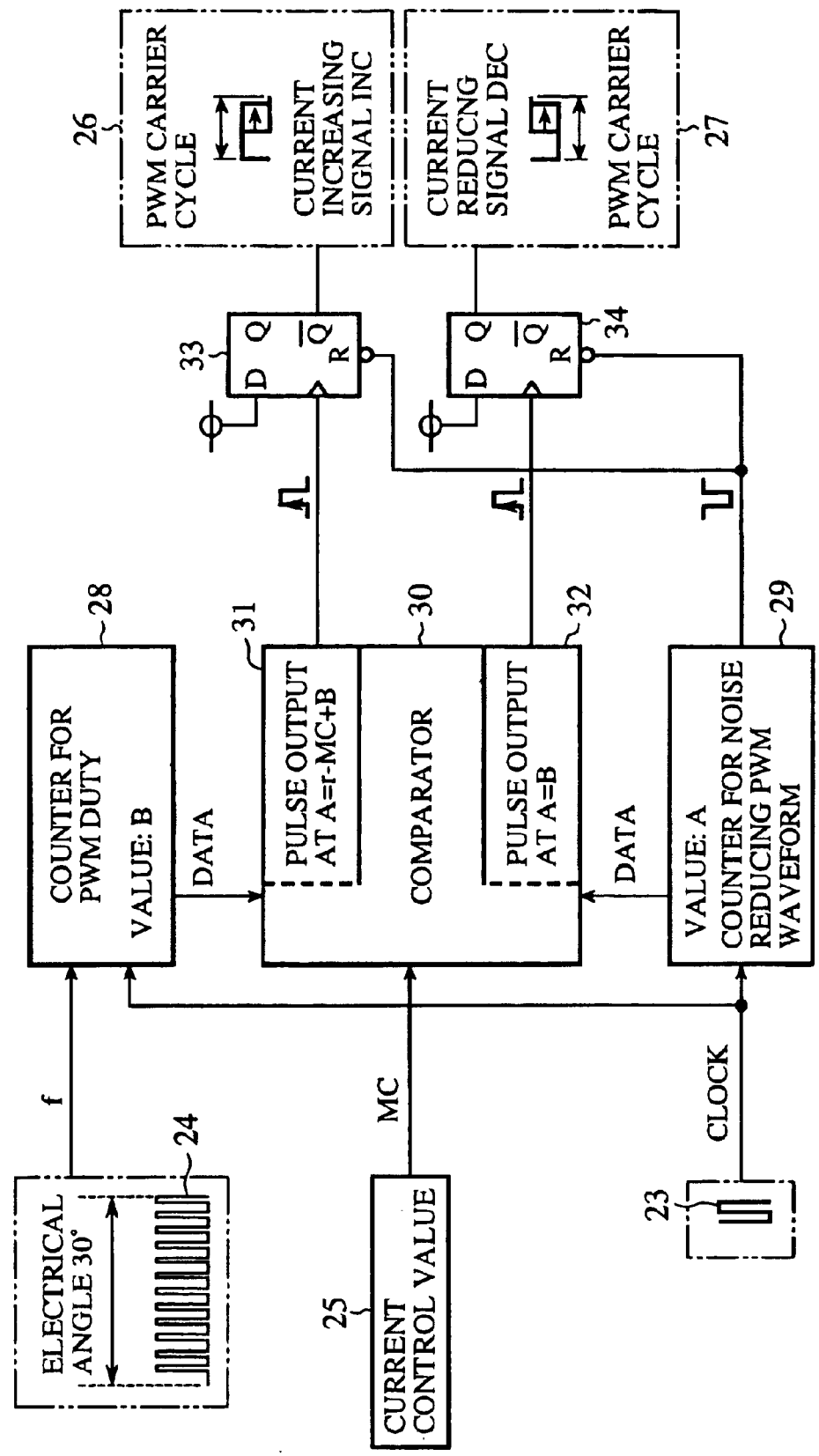
FIG. 6 is a block diagram showing the configuration of a noise reducing waveform signal generator.

FIG. 6 shows the configuration of the noise reducing waveform signal generator 16. A reference numeral 28 denotes a counter for storing a count value B, and counting pulses entered at equal intervals within an electrical angle 30°; and 29 a counter for repeating counting from 0 to the upper limit value r of current control values, specifically a counter for storing the count value of a midway, i.e., a current control value MC, as A, and outputting "L" after each counting up to the upper limit value r of the current control values, the counters 28 and 29 being realized by one counter in an actual circuit. A reference numeral 30 denotes a comparator for comparing count values with each other, the comparator being divided into a pulse output portion 31 for outputting a pulse with the count value of the counter 29 set at A=r−MC+B, and a pulse output portion 32 for outputting a pulse with count A=count value B; 33 a converter for receiving the rising edge of the pulse outputted from the pulse output portion 31, changing the logic of Q from "H" to "L", and returning the value of Q from "H" to "L" by a reset signal of the counter 29; and 34 also a converter logically different but operationally similar to the counter 33. DEC and INC signals 35 and 36 are respectively outputted from the converters 33 and 34.

Next, an operation will be described.

Figure 7:
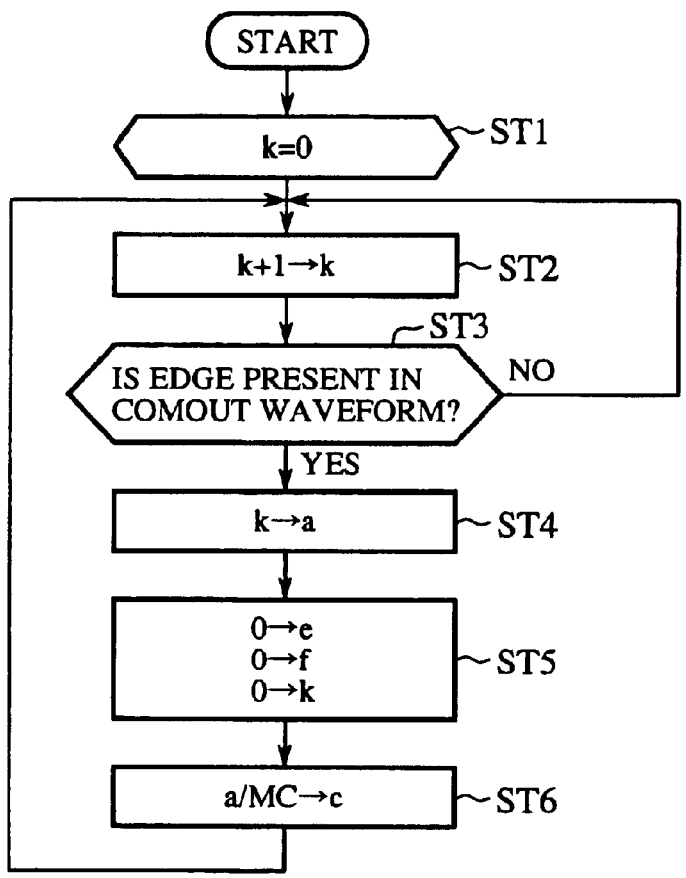
FIG. 7 is a flowchart illustrating an algorithm for generating a noise reducing waveform.

FIG. 7 is a flowchart of a basic operation illustrating a method for generating a motor driving noise reducing waveform according to the invention. After the start of the process, a count value k is set to 0 (step ST1), and 1 is added to k every time a clock signal is received (step ST2). Determination is made as to whether an edge is present or not in a COMOUT signal waveform that changes a polarity at every electrical angle 30° (step ST3). If NO, then the above counting operation is repeated. If YES, the count value k is set as a current changing width value a (value changed by a revolution speed of the motor) (step ST4), and a count value e, a duty control value f and the count value k are initialized (step ST5). Then, division is executed by the divider 14 for the current changing value a outputted from the counter 13 and a current control value MC (preset within an upper limit value r) outputted from the current control value output circuit 11, and the result of the division, i.e., a current amplification factor value c, is outputted to the timing signal generator 15. For example, if a current changing width value is a=1600 pulse, and a current control value MC is 80%=12 f, then a current amplification factor value c is set at c=133 pulse.

Figure 8:
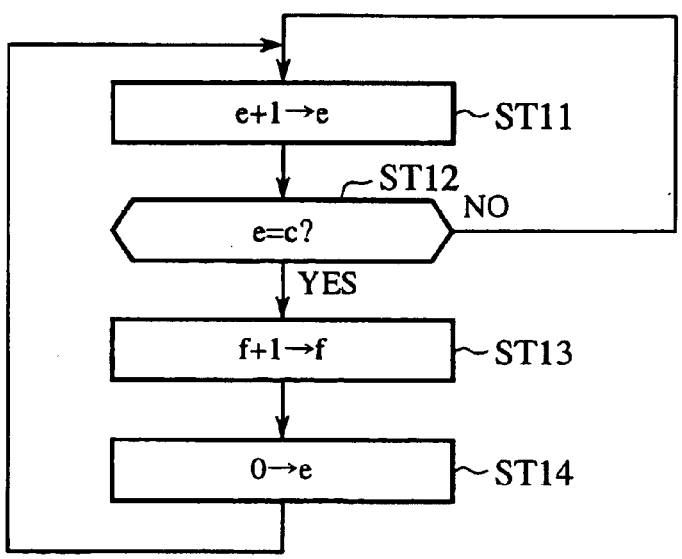
FIG. 8 is a flowchart illustrating an algorithm for obtaining a duty control value f based on a value obtained by the algorithm of FIG. 7.

As shown in FIG. 8, the timing signal generator 15 adds 1 to the count value e every time a clock signal is received (step ST11), and determination is made as to whether the count value e is equal to the amplification factor value c or not (step ST12). If NO, then the above-described counting is repeated. If YES, 1 is added to the duty control value f (step ST13), and the count value e is initialized to 0 (step ST14).

Figure 9:
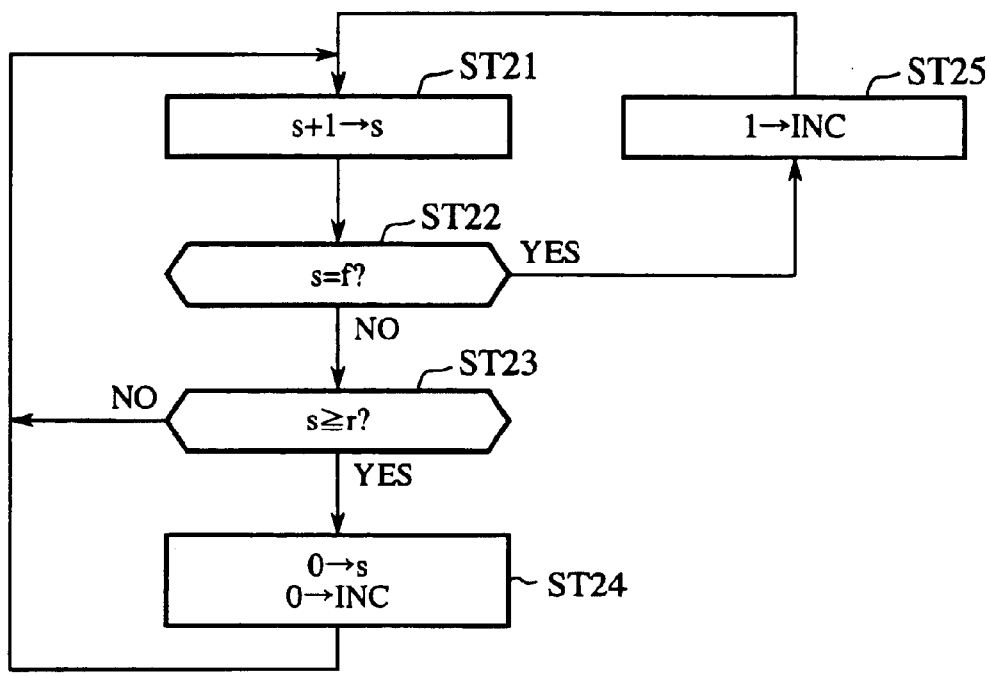
FIG. 9 is a flowchart illustrating an algorithm for generating a current increasing waveform.

As shown in FIG. 9, the noise reducing waveform signal generator 16 adds 1 to a count value s every time a clock signal is received (step ST21), and determination is made as to whether count value s=duty control value f has been set or not (step ST22). If YES, an INC signal is set to 1, and the process returns to step ST21 (step ST25). On the other hand, If NO, determination is made as to whether the upper limit value r of the current control value is equal to or larger than the count value (s≧r) (step ST23). If NO, the process returns to step ST21. If YES, the count value s and the INC signal 26 are initialized to 0 (step ST24). In other words, an algorithm from a current 0 to a preset current control value MC is executed.

Figure 10:
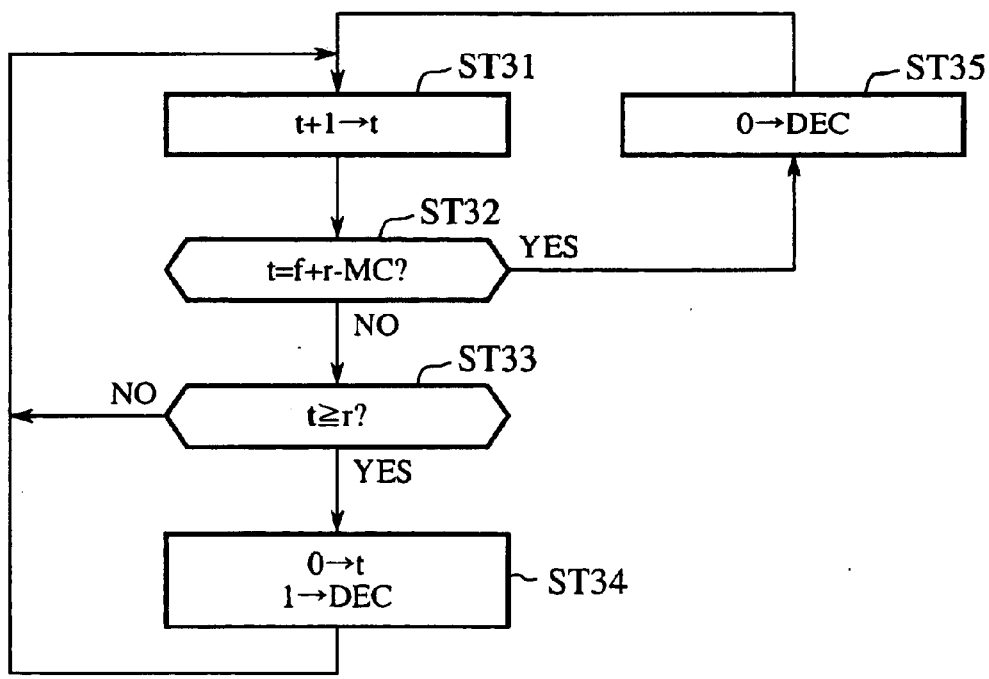
FIG. 10 is a flowchart illustrating an algorithm for generating a current reducing waveform.

In addition, as shown in FIG. 10, the noise reducing waveform signal generator 16 adds 1 to a count value t every time a clock signal is received (step ST31). Determination is made as to whether the count value t has become equal to the value of the duty control value f+ (upper limit value r of the current control value−current control value MC) (step ST32). If YES, a DEC signal 27 is set to 0, and the process returns to step ST31 (step ST35). On the other hand, if NO, determination is made as to whether the upper limit value r of the current control value is equal to or smaller than the count value t (t>r) (step ST33). If NO, the process returns to step ST31. If YES, the count value t is initialized to 0, and a DEC signal 27 is set to 1 (step ST34), and the process returns to step ST31. In other words, an algorithm in which a preset current control value MC becomes a current 0 is executed.

Figure 11A:
FIGS. 11A and 11B are illustration respectively showing an IN signal control waveform of a PWM duty 50%, and an LE signal control waveform of a PWM duty changed from 50% to 0%.
Figure 11B:
Figure 11C:
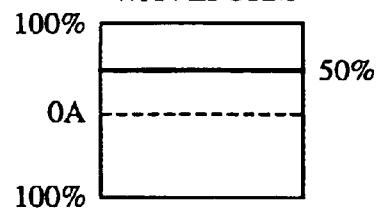
FIGS. 11C and 11D are illustration respectively showing relations between current waveforms and the IN and LE signal control waveforms of FIGS. 11A and 11B.
Figure 11D:
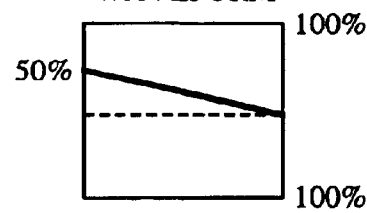
Figure 12A:
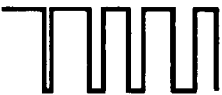
FIGS. 12A and 12B are illustrations respectively showing an LE signal control waveform of a PWM duty changed from 0% to 50%, and an IN signal control waveform of a PWM duty 50%.
Figure 12B:
Figure 12C:
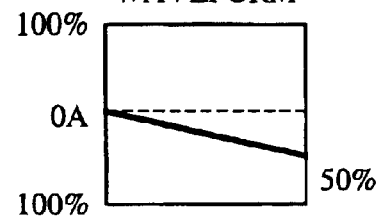
FIGS. 12C and 12D are illustrations respectively showing relations between current waveforms and the LE and IN signal control waveforms of FIGS. 12A and 12B.
Figure 12D:
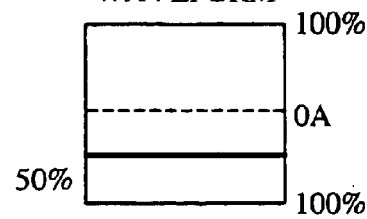
Figure 13A:
FIGS. 13A and 13B are illustrations respectively showing an IN signal control waveform of a PWM duty 80%, and an LE signal control waveform of a PWM duty changed from 80% to 0%.
Figure 13B:
Figure 13C:
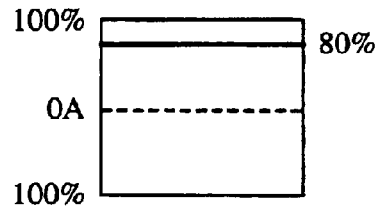
FIGS. 13C and 13D are illustrations respectively showing relations between current waveforms and the IN and LE signal control waveforms of FIGS. 13A and 13B.
Figure 13D:
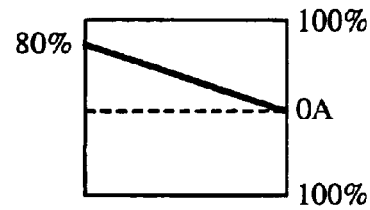
Figure 14A:
FIGS. 14A and 14B are illustrations respectively showing an LE signal control waveform of a PWM duty changed from 0% to 80%, and an IN signal control waveform of a PWM duty 80%.
Figure 14B:
Figure 14C:
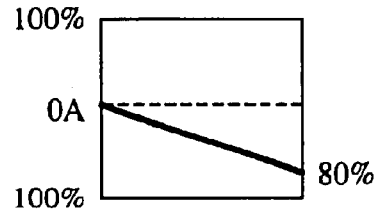
FIGS. 14C and 14D are illustrations respectively showing relations between current waveforms and the LE and IN signal control waveforms of FIGS. 14A and 14B.
Figure 14D:
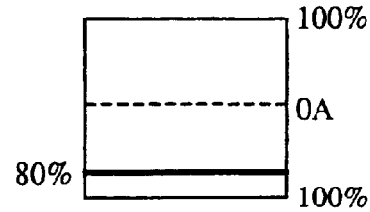

FIGS. 11A to 11D, 12A to 12D, 13A to 13D, and 14A to 14D illustrate the PWM relations of the LE and IN signals. Specifically, in each of FIGS. 11A and 11C and FIGS. 12B and 12D, a PWM cycle of the IN signal is constant within an electrical angle 30°. FIGS. 11B and 11D show a case where a current is continuously reduced from 50% to 0% by changing a PWM duty of the LE signal from 50% to 0%. FIGS. 12A and 12C show a case where a current is continuously increased from 0% to 50% by changing a PWM duty of the LE signal from 0% to 50%. Thus, a PWM cycle of the LE signal is linearly increased/decreased within the electrical angle 30°. As in the above-described example, if a current amplification factor value c=133 pulse is obtained with a current changing width value set at a=1600, and a current control value MC set at 50%=12 f, 1 is added to a duty control value every time the number of pulses for the current amplification factor value c=133 pulse. Accordingly, a count value up to the duty control value f is changed, duty ratios are changed for LE signal control waveforms as shown in FIGS. 11B and 12A, and continuously changed current waveforms are obtained as shown in FIGS. 11C and 12D.

Also in the described algorithm, a linear change occurs in the value of a motor current caused to flow by the INC and DEC signals 26 and 27. According to this algorithm, a linear operation is carried out. However, a nonlinear operation can be achieved by a similar algorithm. FIGS. 13B and 13D and FIGS. 14A and 14C respectively show cases where PWM duties are changed from 80% to 0% and 0% to 80%, similarly to the cases of FIGS. 11B and 11D and 12A and 2C.

The INC/DEC selector 17 selects the DEC signal 27 when the entered COMOUT signal is "H", and the INC signal 26 when it is "L". The DEC signal 27 and the INC signal 26 selected by the INC/DEC selector 17 are synthesized with the LE signals entered to the input terminal 18 by the signal synthesizing circuit 19, and then outputted as the LE signals shown in FIG. 4 from the output terminal 21.

On the other hand, the PWM waveform signal generator 12 generates a PWM waveform signal based on a current control value MC outputted from the current control value output circuit 11. This PWM waveform signal is synthesized with the IN signals entered to the input terminal 18 by the PWM synthesizer 20, and outputted as the IN signals shown in FIG. 4 from the output terminal 21.

Then, the LE and IN signals after the noise reducing control waveform synthesis shown in FIG. 4 are entered to the output transistor control circuit 7. By the IN and LE signals as 120° current application control signals shown in FIG. 15, outputted from the output transistor control circuit 7, currents are successively applied to the transistors Q1, Q2•Q3, Q4•Q5, and Q6 to drive the motor 1. In this case, since currents like those shown in FIG. 16 flow to the motor windings 1U, 1V and 1W, no sudden changes occur in the currents, making is possible to reduce torque fluctuation.

As described above, according to the first embodiment, since a current is continuously changed even at the time of phase switching by supplying a noise reducing waveform signal to each phase winding of the motor according to a motor speed of revolution and a current control value, without any dependence on the number of motor stators, torque fluctuation is limited, making it possible to reduce the occurrence of vibration, and prevent the mutual short-circuiting of the phases. Moreover, since the noise reducing waveform signal can be generated by the digital circuit composed only of the arithmetic unit and the comparator without needing any large-capacity capacitors or the like, the apparatus is highly advantageous in cost performance and product yield.

Second Embodiment

Figure 17:
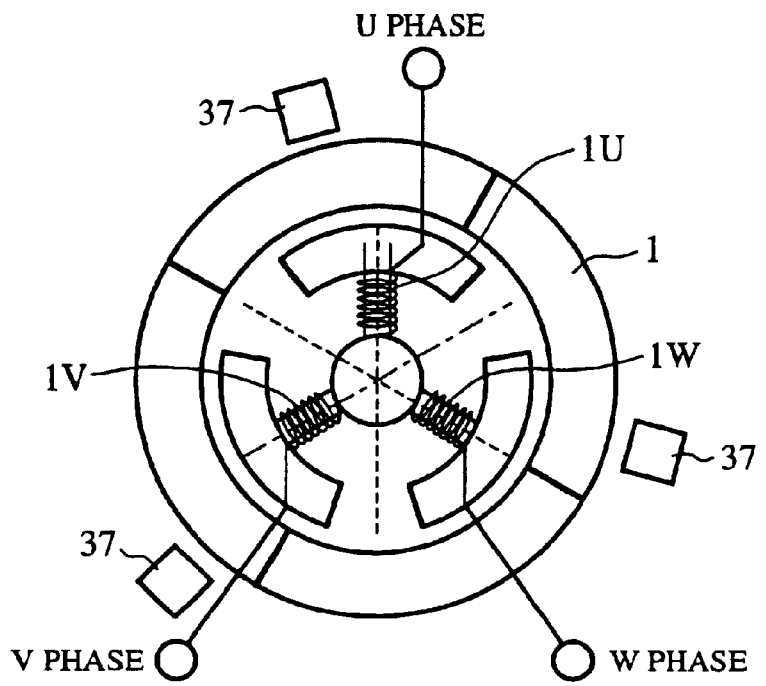
FIG. 17 is a schematic diagram of a motor equipped with Hall sensor.
Figure 18:
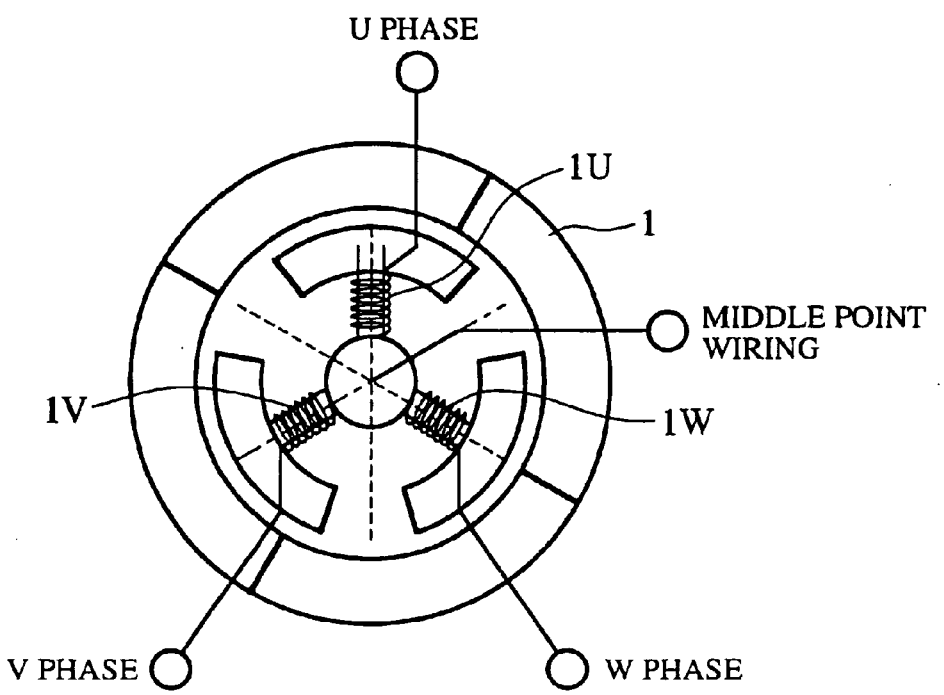
FIG. 18 is a schematic diagram of a motor without any Hall sensors (Hall sensorless motor).

FIG. 1 illustrates the Hall sensorless-brushless motor 1 as a motor, and now a principle of rotating this motor will be described. The characteristic of position detection by the Hall sensorless motor compared with that by a motor equipped with Hall sensor will be described by referring to FIGS. 17 and 18. FIG. 17 shows a motor equipped with Hall sensor, in which a rotor position is detected by Hall sensor 37. On the other hand, FIG. 18 shows a Hall sensorless motor, in which a rotor position is detected depending on a high/low potential of each phase with respect to a middle point wiring. This detection is carried out by the position detecting comparator 2 shown in FIG. 1.

When the rotor position is detected by the position detecting comparator 2, two among the phases must always be arrested or grounded against the power supply beforehand. It is because a middle point potential becomes a potential other than the one determined by the comparator. By comparing the middle point potential with the potential of each phase by the position detecting comparator 2, a position of every electrical angle 60° can be detected.

The problem of the second embodiment lies in the fact that in order to obtain positional information, the two phases outside the target one whose positional information should be read must be arrested or grounded against the power supply for a fixed time. To rotate the motor at a low speed, a large amount of current must not be supplied to the motor. However, to detect the positional information, a voltage must be biased to the motor.

Figure 15:
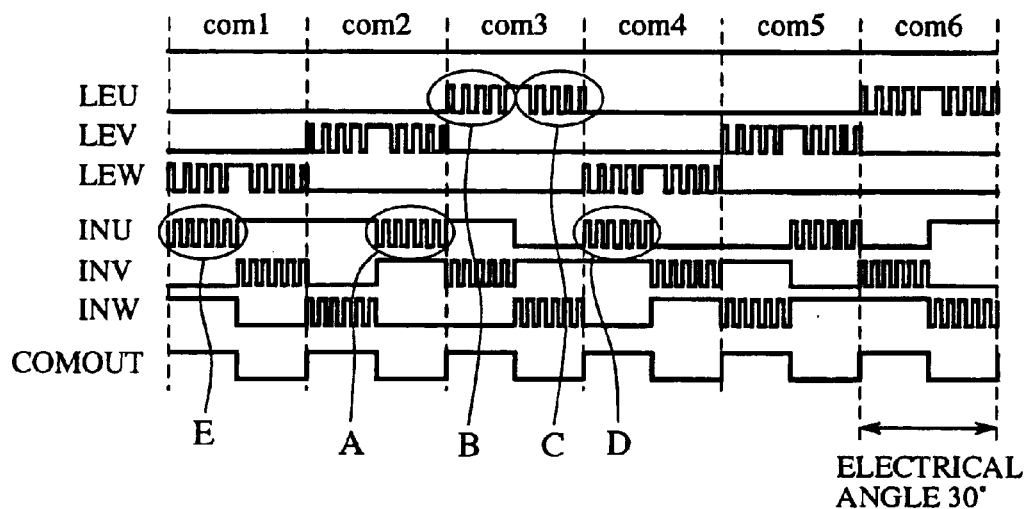
FIG. 15 is a waveform chart of a noise reducing control signal supplied to a motor.
Figure 16:
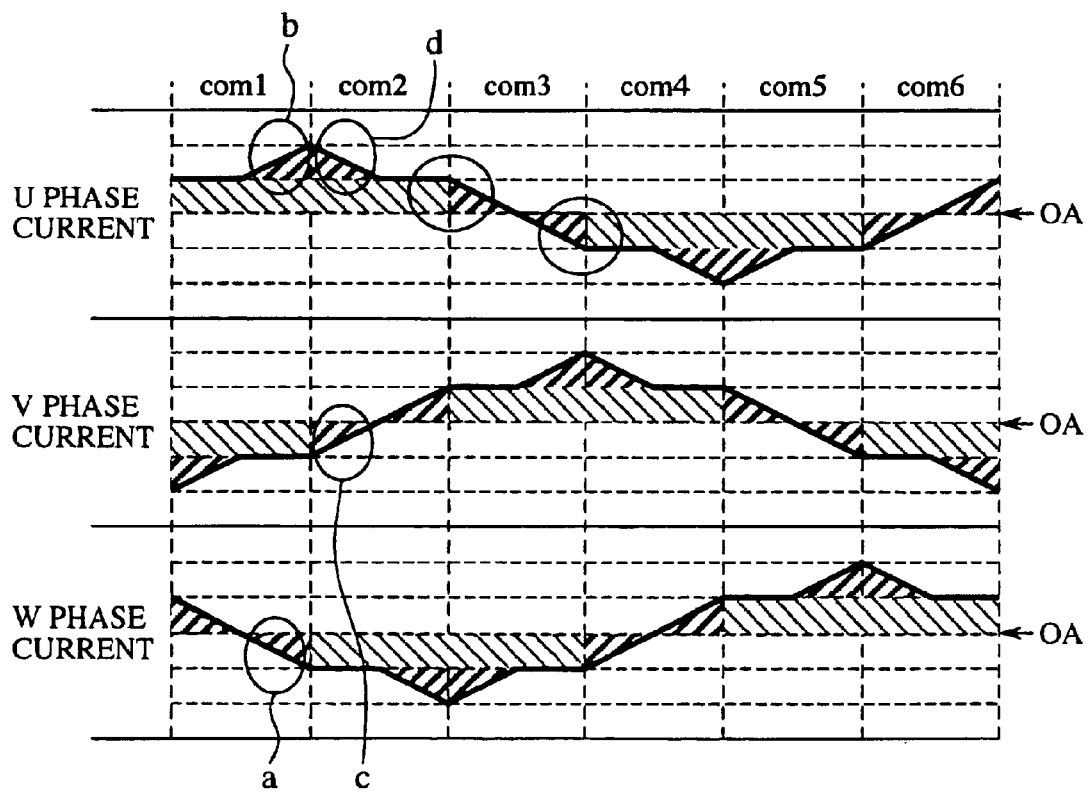
FIG. 16 is a waveform chart of a noise reducing current waveform flowing to a motor winding.
Figure 19:
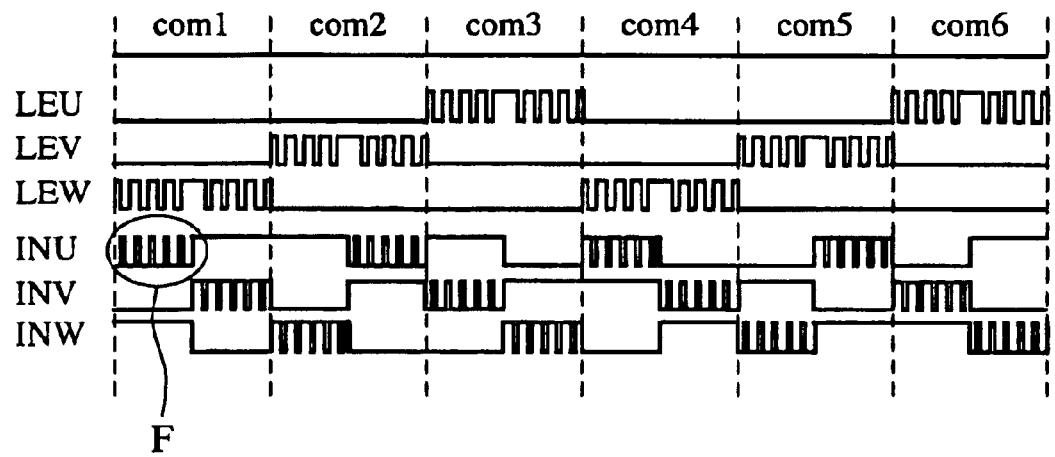
FIG. 19 is a waveform chart of signals before low revolution control measures are taken.

As a conventional control waveform, a waveform during high-speed rotation is represented by E in FIG. 15. The waveforms of the LE and IN signals when the motor is rotated at a low speed as an extension case of the conventional system are shown in FIG. 19. In the case of low-speed rotation made by the conventional system, as shown in FIG. 19, the pulse width of the IN signals is narrow. Since a pulse width smaller than a limit shortens a bias time, the above-described requirement 1 for detecting a position cannot be met.

Figure 20:
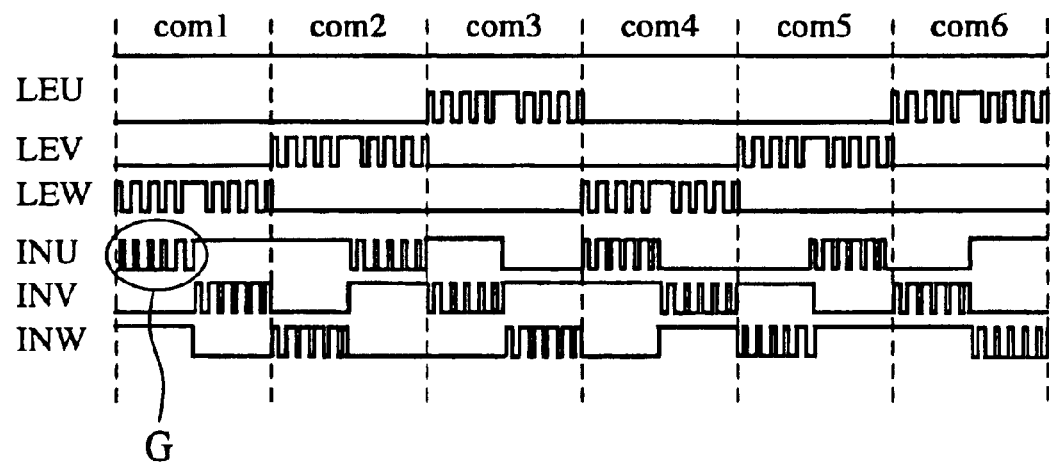
FIG. 20 is a waveform chart of signals after the low revolution control measures are taken.
Figure 21:
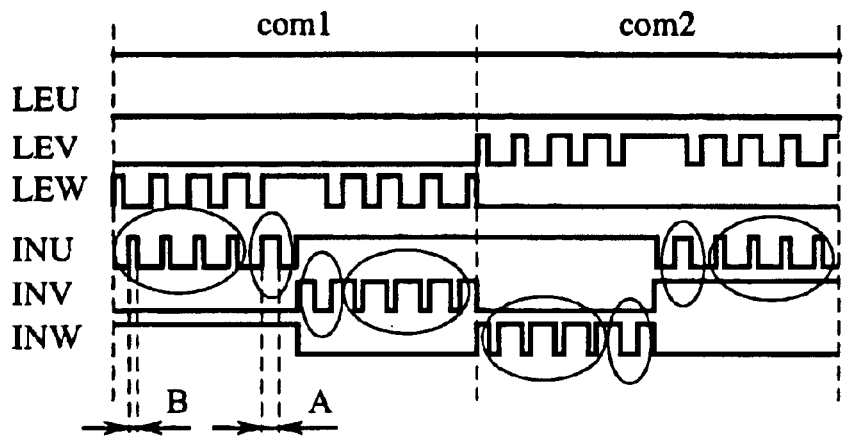
FIG. 21 is a partially expanded view of signal waveforms after the low revolution control measures are taken.
Figure 22:
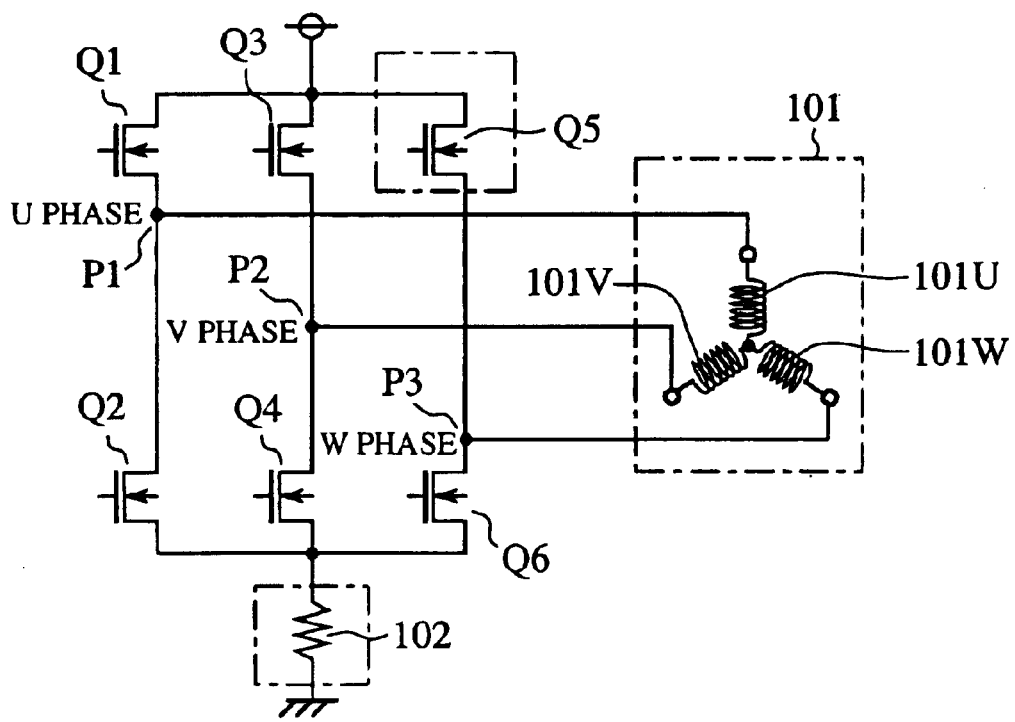
FIG. 22 is an illustration showing a driving circuit chart of a 3-phase brushless motor.
Figure 23:
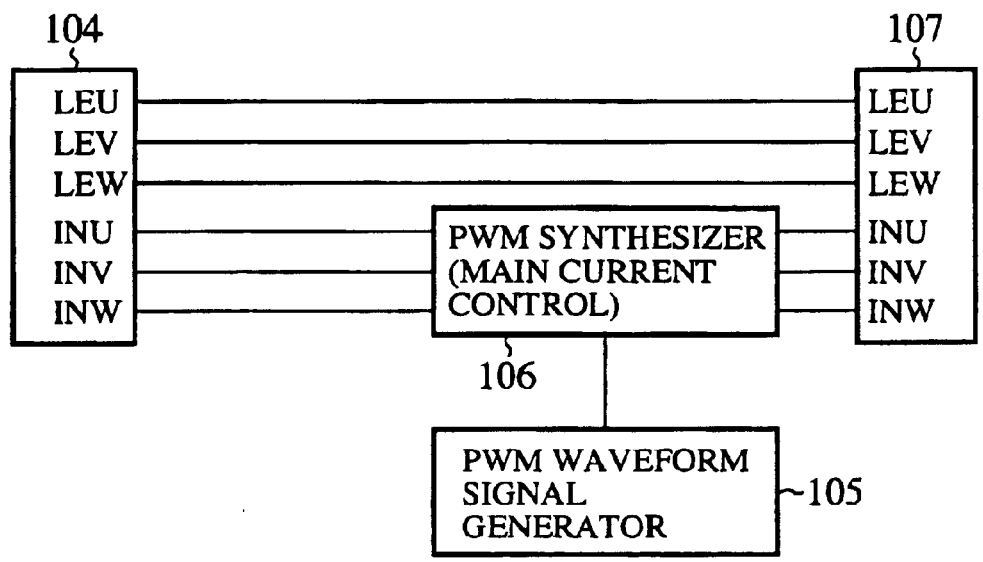
FIG. 23 is a block diagram showing a driving signal generating circuit of the 3-phasee brushless motor.
Figure 24:
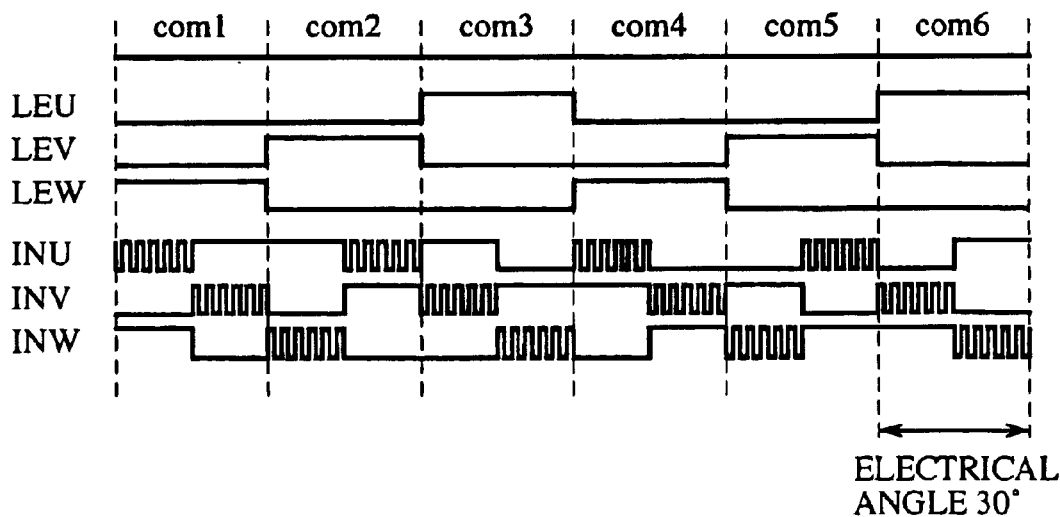
FIG. 24 is a waveform chart of a 120° current application control signal supplied to the 3-phase brushless motor.
Figure 25A:
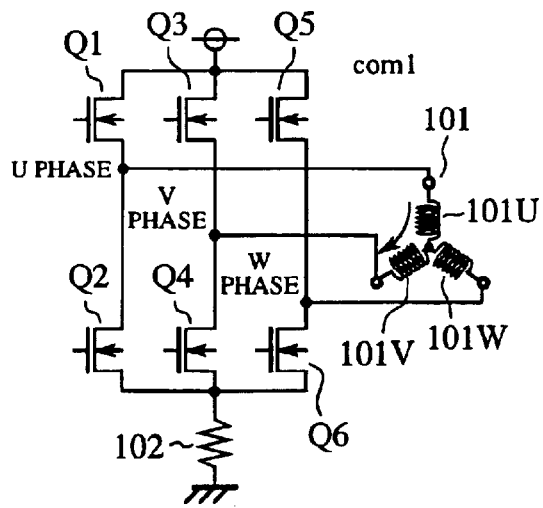
FIGS. 25A to 25F are views, each illustrating a state where current application is switched to each phase winding of the 3-phase brushless motor by every electrical angle of 60°.
Figure 25D:
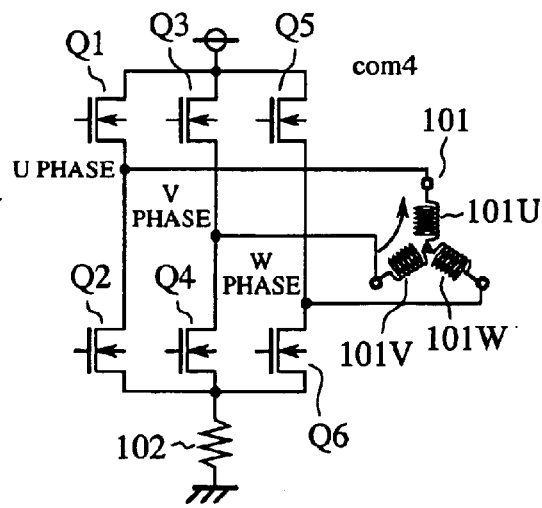
Figure 25B:
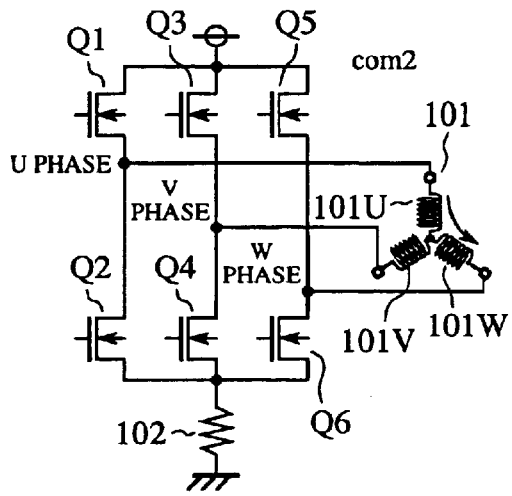
Figure 25E:
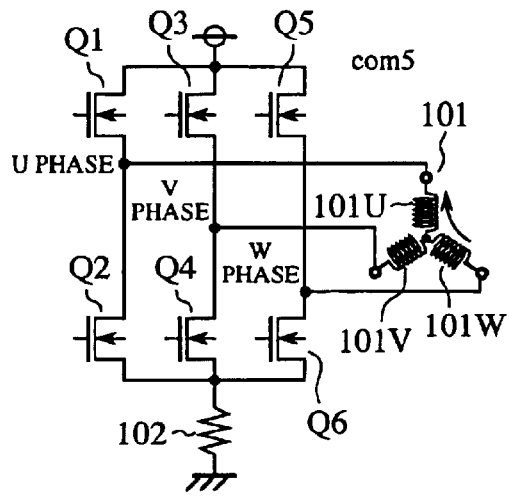
Figure 25C:
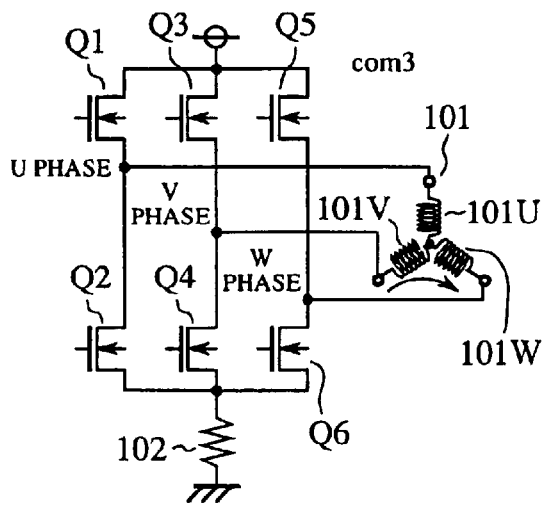
Figure 25F:
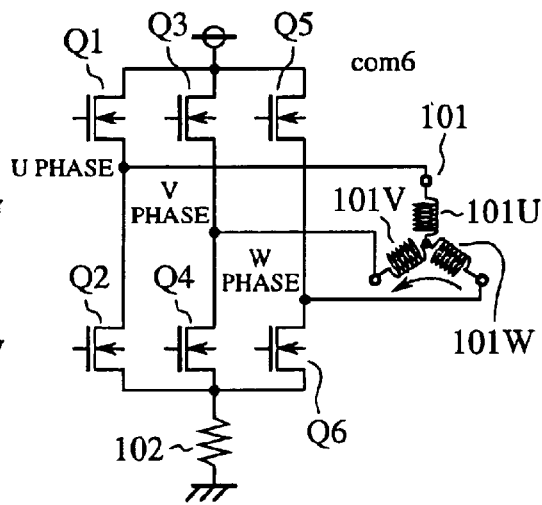
Figure 26:
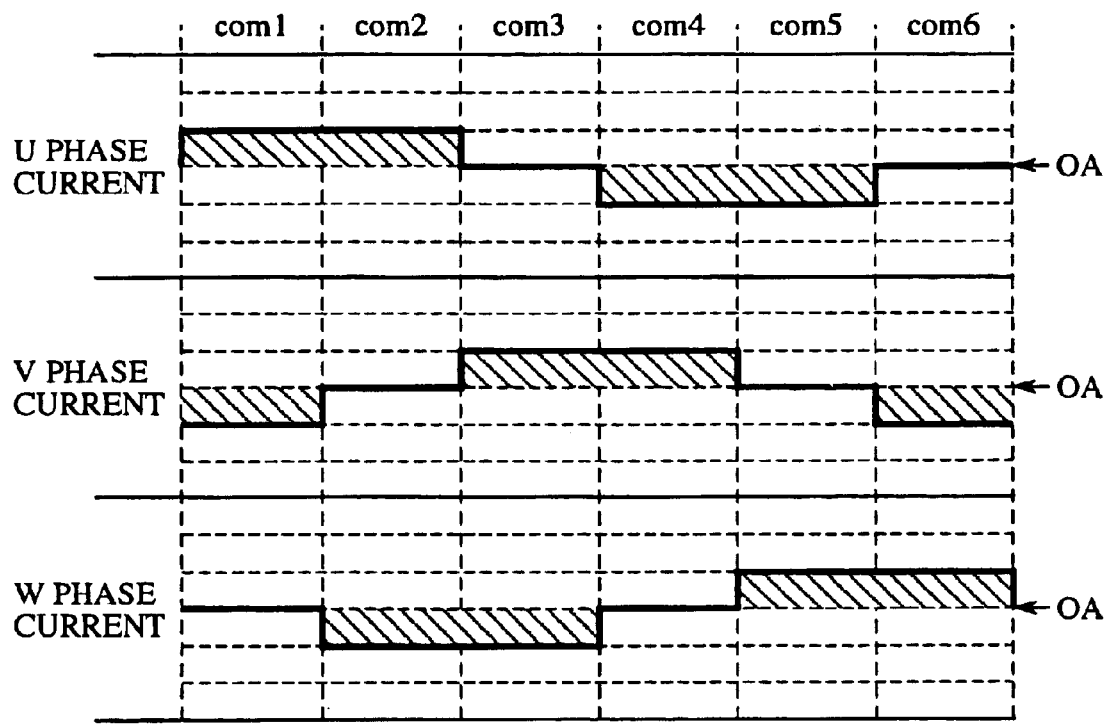
FIG. 26 is a waveform chart of a 120° current application current flowing to the 3-phase brushless motor.
Figure 27:
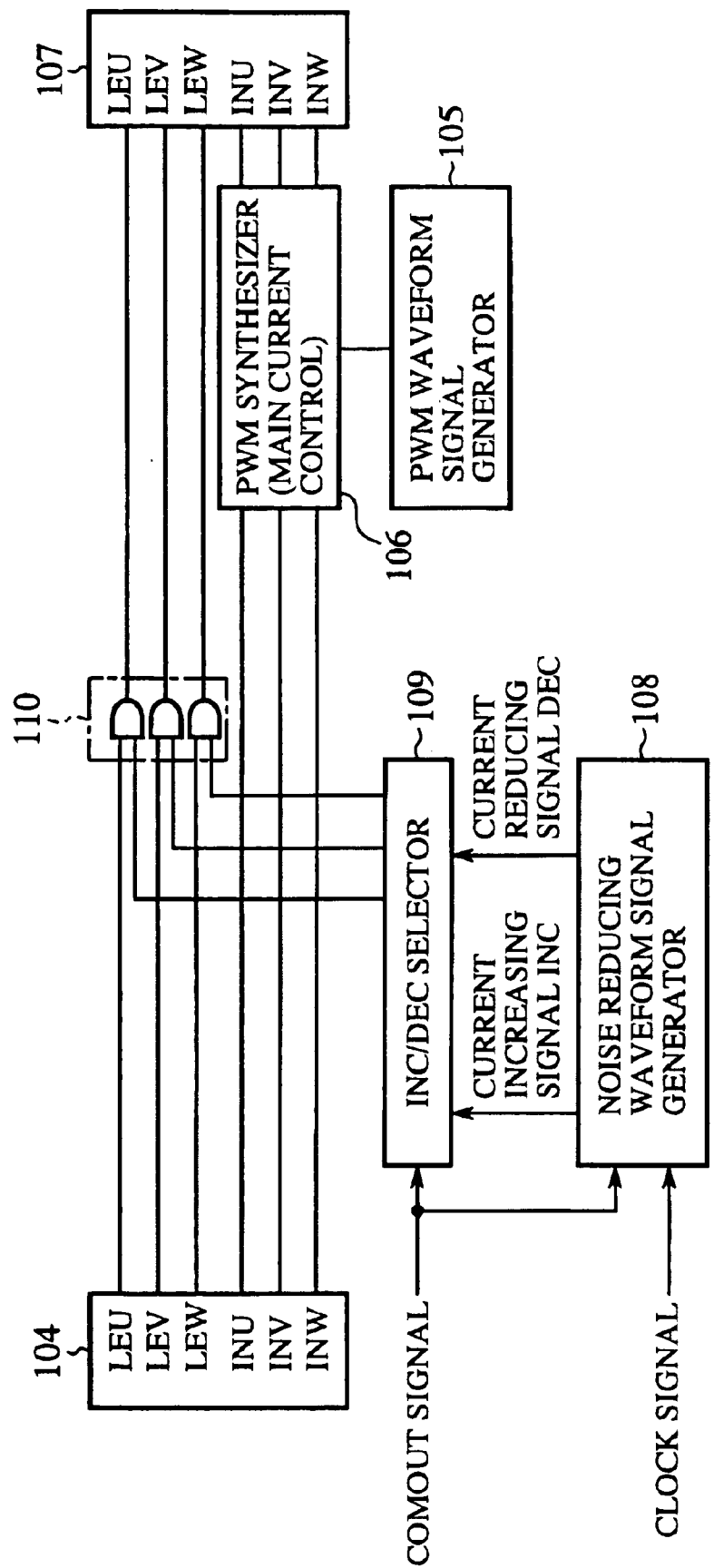
FIG. 27 is a block diagram showing a driving noise reducing signal generation circuit of the 3-phase brushless motor.
Figure 28:
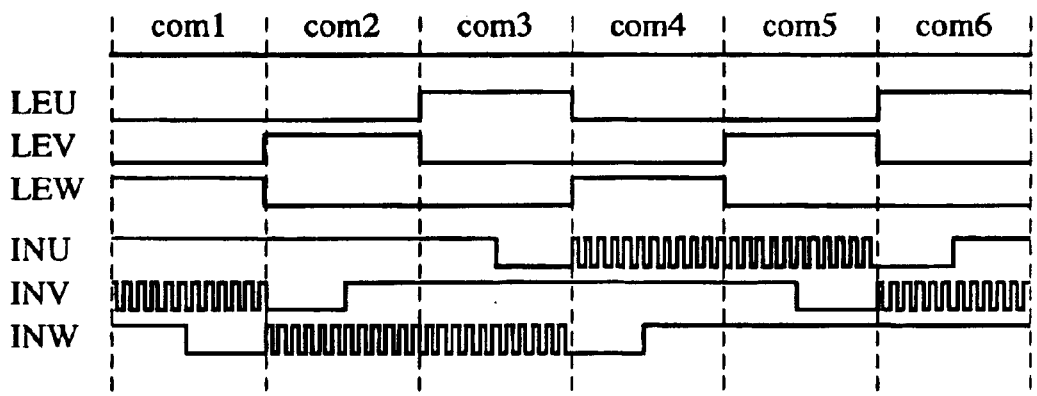
FIG. 28 is a view showing a conventional PWM waveform pattern before a noise reducing signal is synthesized with LE signals.
Figure 29:
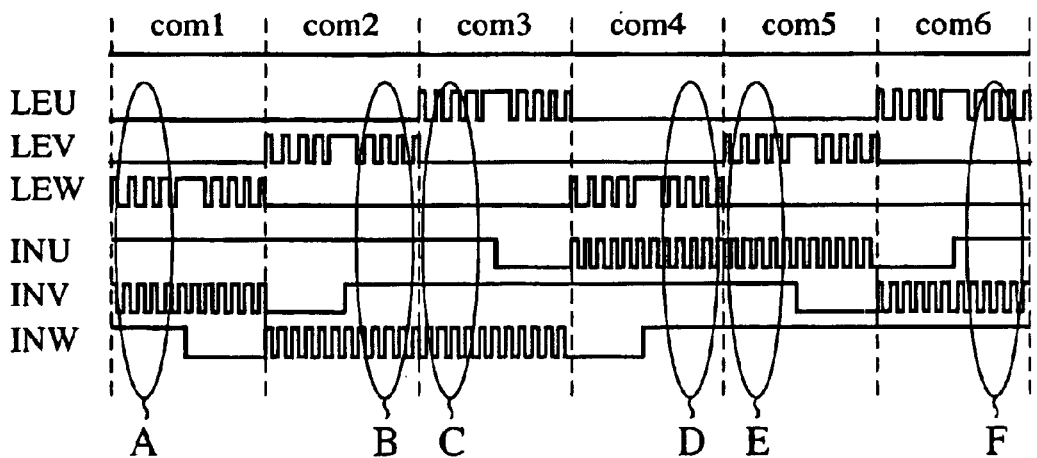
FIG. 29 is a waveform chart of signals obtained by adding a noise reducing signal from a conventional driving noise reducing circuit to LE signals.
Figure 30:
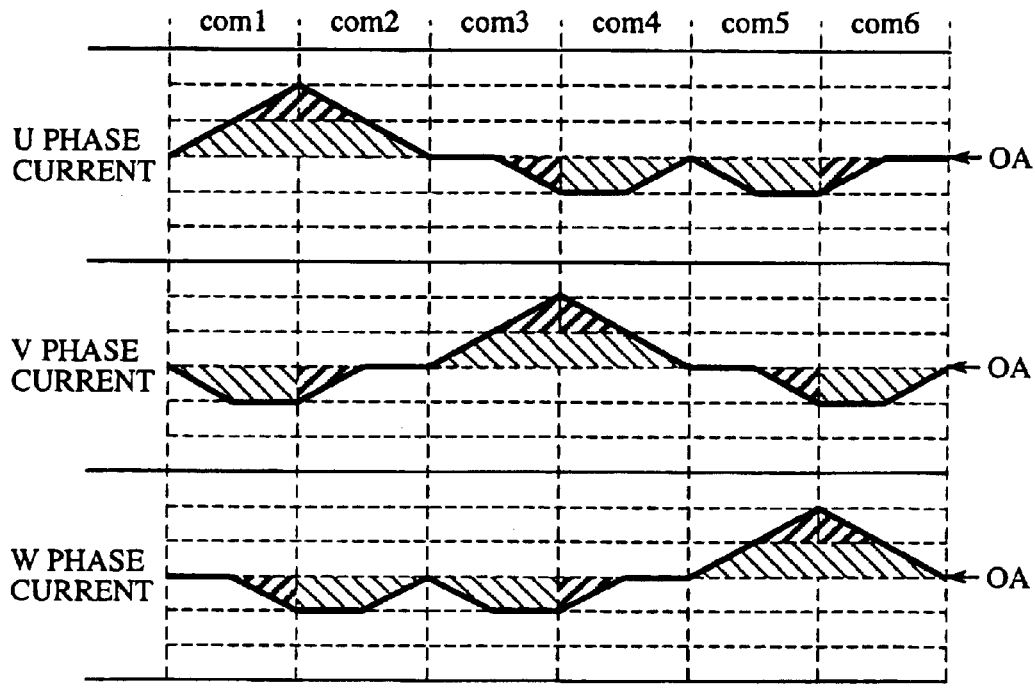
FIG. 30 is a waveform chart of currents flowing to the 3-phase brushless motor.
Figure 31:
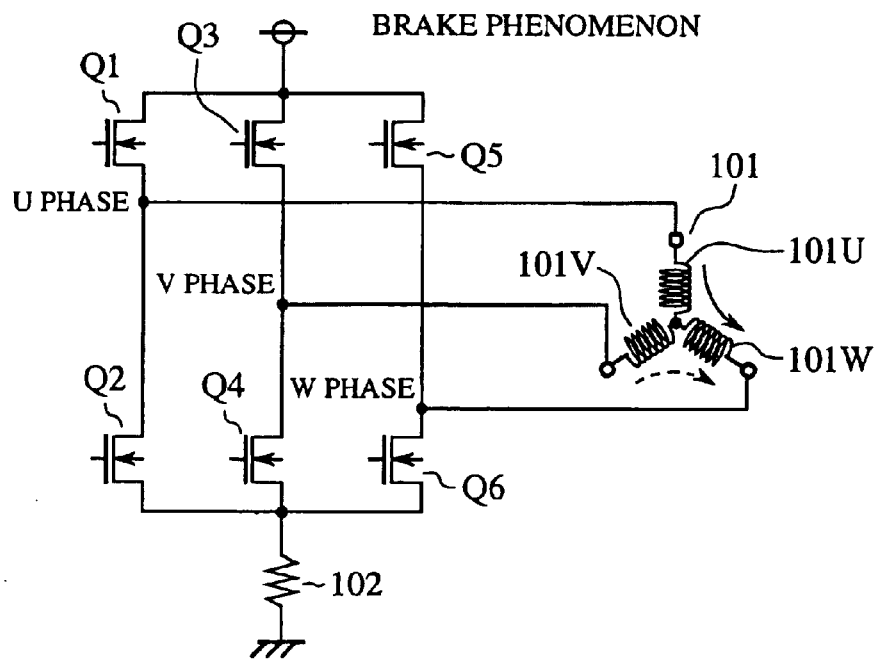
FIG. 31 is a view illustrating an occurrence of a brake phenomenon in the 3-phase brushless motor.

The second embodiment solves the foregoing problem. Specifically, based on a detecting signal from the position detecting comparator (position detecting means) 2 for detecting the rotational position of the motor by comparing the terminal voltage of each phase winding of the motor with the voltage of the middle point connecting the phase windings, a signal is outputted from the sensorless driving arithmetic circuit 4, which signal is used to increase the width of current application of the motor winding receiving a current at present. The waveforms of the LE and IN signals in this case are shown in FIG. 20, and the partial expanded view thereof is shown in FIG. 21. As can be seen, there is one place having an increased current application width. Characteristically, a portion A has a larger pulse width than a portion B. By using such a control waveform to drive the motor, position detection can be carried out even if the motor is rotary-driven at a low speed. In addition, time for biasing a voltage to the motor is secured only for a portion in the vicinity of position to be detected.

Thus, according to the second embodiment, even in the case of the Hall sensorless-brushless motor 1, it is possible to rotate the motor at a low speed by causing a large amount of current to flow in the vicinity of the rotor position detection.

The advantages of the present invention can be summarized as follows.

As described above, the motor driving noise reducing apparatus of the invention comprises: the plurality of switching circuits each including a pair of switching elements connected in series between a power supply and a ground; the motor, one end of each of its phase windings is connected to a switching element serial connection point of each of the switching circuits; the noise reducing circuit for generating a current increasing signal and a current reducing signal; the selecting circuit for selecting and outputting the current increasing/reducing signal based on a commutation control signal for changing a polarity at every prescribed electrical angle; the signal synthesizing circuit for synthesizing the current increasing/reducing signal selected by the selecting circuit with a current application control signal supplied to a power supply side switching element of the paired switching elements; the PWM waveform signal generator for outputting a PWM waveform signal based on a current control value; and the PWM synthesizer for synthesizing the PWM waveform signal with a current application direction deciding signal supplied to a ground side switching element of the paired switching elements. Thus, since a current is continuously changed even at the time of phase switching, torque fluctuation is limited, making it possible to reduce the occurrence of vibration, to prevent the short-circuiting of the phases from one another, and so on.

According to the motor driving noise reducing apparatus of the invention, the noise reducing circuit includes: the current control value output circuit for storing a current control value; the bias time counter for storing a current changing width of an electrical angle 30°; the arithmetic circuit for obtaining a current amplification factor from the current control value and the current changing width; the noise reducing duty increasing/decreasing timing signal generator for generating a duty control value based on a commutation control signal that reverses a polarity every electrical angle 30°, a clock signal and the current amplification factor; and the noise reducing waveform signal generator for generating a current increasing signal for continuously increasing a current for the amount corresponding to the current changing width within an electrical angle 30°, and a current reducing signal for continuously reducing a current for the amount corresponding to the current changing width within an electrical angle 30°, based on the commutation control signal, the clock signal, the duty increasing/decreasing signal, and the current control value. Thus, because of the simple configuration of the noise reducing circuit, i.e., the components thereof being all digital circuits, it is possible to obtain current increasing and reducing signals with high accuracy.

The motor driving noise reducing apparatus of the invention further comprises: position detecting means for comparing a terminal voltage of each phase winding of the motor with a voltage of a middle point at which the phase windings re connected with one another, and detecting the rotational position of the motor; and sensorless driving arithmetic means for outputting a signal that increases a current application width of a currently energized motor winding, based on the detection signal from the position detecting means. Thus, even in the case of the Hall sensorless-brushless motor 1, by supplying a large amount of current in the vicinity of the falling of the commutation control signal, i.e., in the vicinity of rotor position detection, it is possible to rotate the motor at a low speed.

According to the invention, the method for generating a motor driving noise reducing signal comprises the steps of obtaining a current amplification factor by dividing a current changing width decided according to a motor revolution speed by a current control value: adding 1 to a duty control value every time a count value of a reference clock reaches the current amplification factor; determining whether the count value of the reference clock has reached a maximum value of the current amplification factor, until the count value of the reference clock reaches the duty control value; generating a current reducing signal by setting the count value and the current reduction rate to 0, if the maximum value has been reached; determining whether the count value of the reference clock has reached the maximum value of the current amplification factor, until the count value of the reference clock reaches a value obtained by adding to the duty control value the value which is obtained by subtracting the current control value from the upper limit of the current control value; generating a current increasing signal by setting the count value and the current amplification factor to 0, if the maximum value has been reached; and adding the current increasing signal and the current reducing signal to a current application control signal supplied to a power supply side switching element of the paired switching elements connected in series between a power supply and a ground. Thus, without any dependence on the number of motor stators, it is possible to obtain a noise reducing waveform signal by the digital circuit composed of only the arithmetic unit and the comparator according to a motor speed of revolution and a current control value, i.e., a motor driving noise reducing signal by a low-cost configuration needing no large-capacity capacitors or the like.

What is claimed is:

1. An apparatus for reducing motor driving noise, comprising:

a plurality of switching circuits each including at least a pair of switching elements connected in series between a power supply and a ground;

a motor, one end of each of its phase windings is connected to a switching element serial connection point of each of said switching circuits;

a noise reducing circuit for generating a current increasing signal and a current reducing signal;

a selecting circuit for selecting and outputting the current increasing signal and/or the current reducing signal based on a commutation control signal for changing a polarity at every prescribed electrical angle;

a signal synthesizing circuit for synthesizing either the current increasing signal or the current reducing signal selected by said selecting circuit with a current application control signal supplied to a power supply side switching element of said pair of switching elements;

a PWM waveform signal generator for outputting a PWM waveform signal based on a current control value; and a PWM synthesizer for synthesizing the PWM waveform signal with a current application direction deciding signal supplied to a ground side switching element of said pair of switching elements.

2. The apparatus for reducing motor driving noise according to claim 1, wherein said noise reducing circuit includes: a current control value output circuit for storing a current control value; a bias time counter for storing a current changing width of an electrical angle 30°; an arithmetic circuit for obtaining a current amplification factor from the current control value and the current changing width; a noise reducing duty increasing/decreasing timing signal generator for generating a duty control value based on a commutation control signal for reversing a polarity at every electrical angle 30°, a clock signal and the current amplification factor; and a noise reducing waveform signal generator for generating a current increasing signal for continuously increasing a current for the amount corresponding to the current changing width within an electrical angle 30°, and a current reducing signal for continuously reducing a current for the amount corresponding to the current changing width within an electrical angle 30°, based on the commutation control signal, the clock signal, the duty increasing/decreasing signal, and the current control value.

3. The apparatus for reducing motor driving noise according to claim 1, further comprising: position detecting means for comparing a terminal voltage of each phase winding of the motor with a voltage of a middle point at which the phase windings are connected with one another, and detecting the rotational position of the motor; and sensorless driving arithmetic means for outputting a signal that increases a current application width of a currently energized motor winding, based on a detection signal from said position detecting means.

4. A method for generating a motor driving noise reducing signal, comprising the steps of:

obtaining a current amplification factor by dividing a current changing width decided according to a motor revolution speed by a current control value:

adding 1 to a duty control value every time a count value of a reference clock reaches the current amplification factor;

determining whether the count value of the reference clock has reached a maximum value of the current amplification factor, until the count value of the reference clock reaches the duty control value;

generating a current reducing signal by setting the count value and the current reduction rate to 0, if the maximum value has been reached;

determining whether the count value of the reference clock has reached the maximum value of the current amplification factor, until the count value of the reference clock reaches a value obtained by adding to the duty control value the value which is obtained by subtracting the current control value from the upper limit of the current control value;

generating a current increasing signal by setting the count value and the current amplification factor to 0, if the maximum value has been reached; and adding the current increasing signal and the current reducing signal to a current application control signal supplied to a power supply side switching element of switching elements connected in series between a power supply and a ground.

* * * * *